United States Patent

[11] 3,589,805

[72] Inventor Allen G. Stimson
 Rochester, N.Y.
[21] Appl. No. 828,994
[22] Filed May 29, 1969
[45] Patented June 29, 1971
[73] Assignee Eastman Kodak Company
 Rochester, N.Y.

[54] AC EXPOSURE CONTROL DEVICE FOR A CAMERA
 4 Claims, 7 Drawing Figs.
[52] U.S. Cl.................................................. 352/171
[51] Int. Cl. ................................................ G03b 1/60
[50] Field of Search........................................ 352/170,
 171, 176—179, 180—182, 141; 95/44, 10, 10 C, 42

[56] References Cited
UNITED STATES PATENTS
| | | | |
|---|---|---|---|
| 2,971,432 | 2/1961 | Blank | 352/171 |
| 3,003,389 | 10/1961 | Stimson et al. | 352/171 |
| 3,006,262 | 10/1961 | MacMillin | 352/171 X |
| 3,099,193 | 7/1963 | Freudenschuss | 352/141 X |
| 3,277,803 | 10/1966 | Fukuoka | 352/141 |
| 3,313,224 | 4/1967 | Biedermann | 352/141 X |
| 3,498,193 | 3/1970 | Shimomura et al. | 95/42 X |

Primary Examiner—Donald O. Woodiel
Attorneys—Robert W. Hampton and William C. Dixon, III.

ABSTRACT: An exposure control apparatus is disclosed which includes a source of DC potential; means coupled to the DC source for producing an alternating voltage; a first signal lamp coupled to the alternating voltage producing means and adapted to indicate whether or not the DC potential is above a selected level; photosensitive means having an electrical parameter that varies inversely with the intensity of viewed scene light; and a second signal lamp operatively coupled to the alternating voltage producing means and the photosensitive means and adapted to indicate if scene illumination is sufficient to expose film.

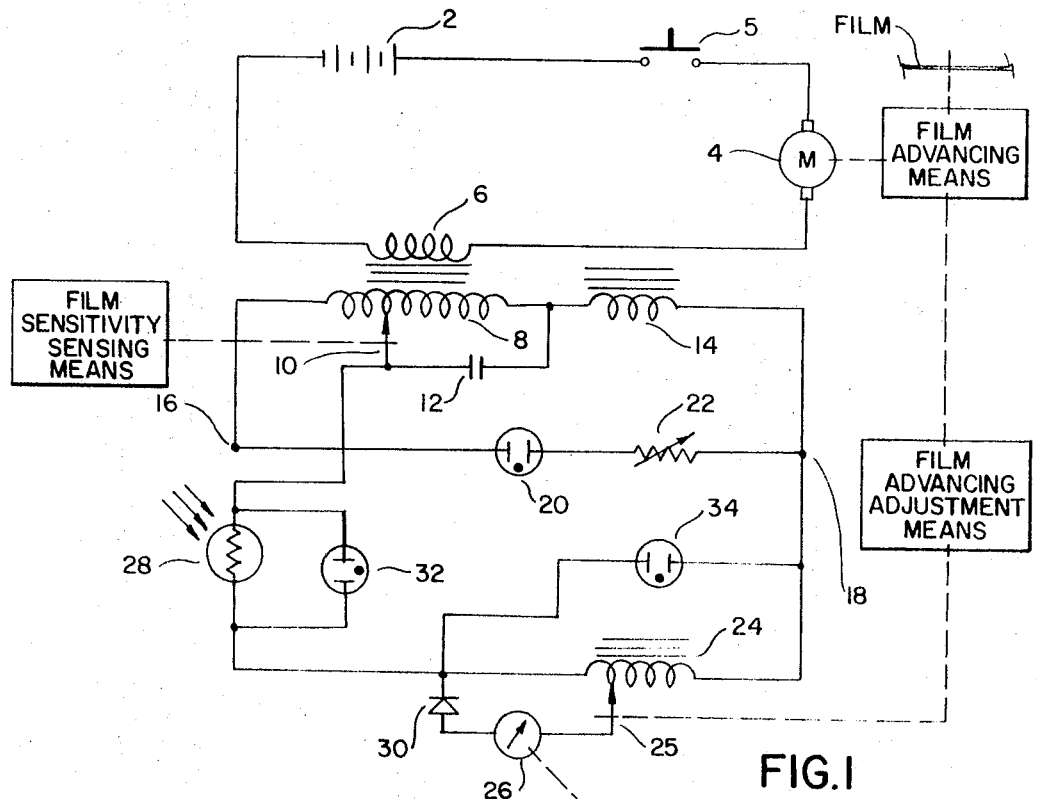
FIG.1
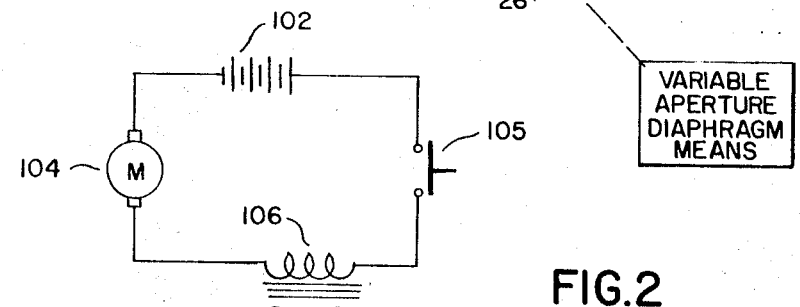
FIG.2
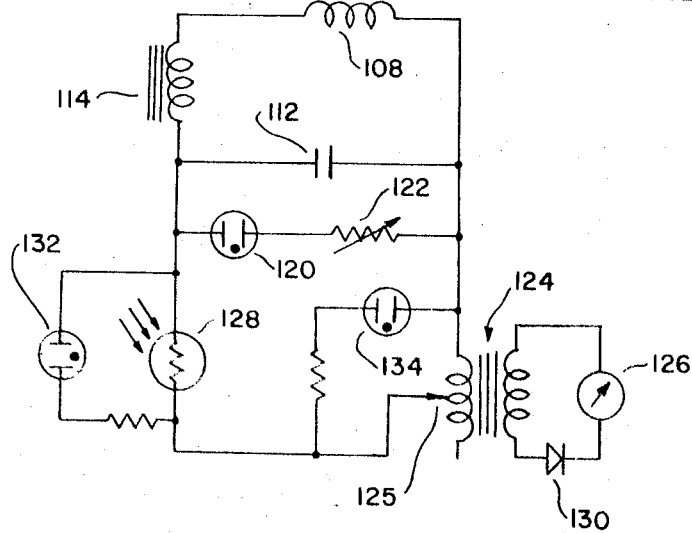
ALLEN G. STIMSON
INVENTOR.
BY William C. Dixon, III
Robert W. Hampton
ATTORNEYS 3,589,805

ALLEN G. STIMSON
INVENTOR.

BY William C. Dixon, III

Robert W. Hampton
ATTORNEYS

PATENTED JUN29 1971 3,589,805

ALLEN G. STIMSON
INVENTOR.

BY William L. Dixon, III

Robert W Hampton
ATTORNEYS

AC EXPOSURE CONTROL DEVICE FOR A CAMERA

BACKGROUND OF THE INVENTION

This invention relates generally to electrically operated cameras, and particularly to electrically operated motion picture cameras. The invention provides a device for producing visual signals to indicate whether satisfactory exposures can be made under existing lighting conditions at given camera settings, and whether the electrical source has sufficient voltage to operate the camera.

SUMMARY OF THE INVENTION

An object of the present invention is to provide an AC exposure-control device for a camera to indicate visually whether ambient illumination conditions will permit proper exposures to be made.

Another object is to provide an AC exposure-control device for a camera to indicate visually whether the power source has sufficient voltage to energize the device.

A further object is to provide an AC exposure-control device for a camera to sense separately the light levels from different parts of a photometric scene and to produce signals indicative of illumination conditions of the scene.

A still further object is to provide an AC exposure-control device for a camera that operates with low power to indicate the values of various photographic parameters, that produces easily understandable signals, and that is easy to make and use.

To meet these and other objects, the present invention provides an exposure-control device for use with a camera, wherein the device comprises means for establishing a source of alternating voltage; photosensitive means for receiving radiation from a scene, the photosensitive means having an electrical parameter that is variable in relation to the intensity of the radiation received from the scene; and means operatively connected to, and responsive to variations in the electrical parameter of, the photosensitive means for indicating whether the intensity of radiation from the scene is suitable to effect a satisfactory exposure of film in the camera.

The invention, and its objects and advantages, will become more apparent in the detailed description of the illustrated embodiments presented below.

BRIEF DESCRIPTION OF THE DRAWINGS

In the detailed description of the illustrated embodiments of the invention presented below, reference is made to the accompanying drawings, in which:

FIGS. 1—4 and 6 show exposure-control circuits according to the present invention, each incorporating an electrical source, a transformer, and at least one signal lamp to indicate whether camera settings are adequate for a proper exposure under prevailing light conditions, and to indicate whether the electrical source is supplying sufficient voltage;

FIGS. 1—4 shown circuits having separate lamps for the signals to be generated;

FIG. 3 shows an embodiment of the invention incorporating optional neutral-density filters;

FIG. 4 shows a circuit adapted to a binary system for responding to different portions of a photometric scene;

FIG. 6 shows a circuit employing a single lamp for indicating high and low light conditions.

DESCRIPTION OF THE ILLUSTRATED EMBODIMENTS

Figure 3:
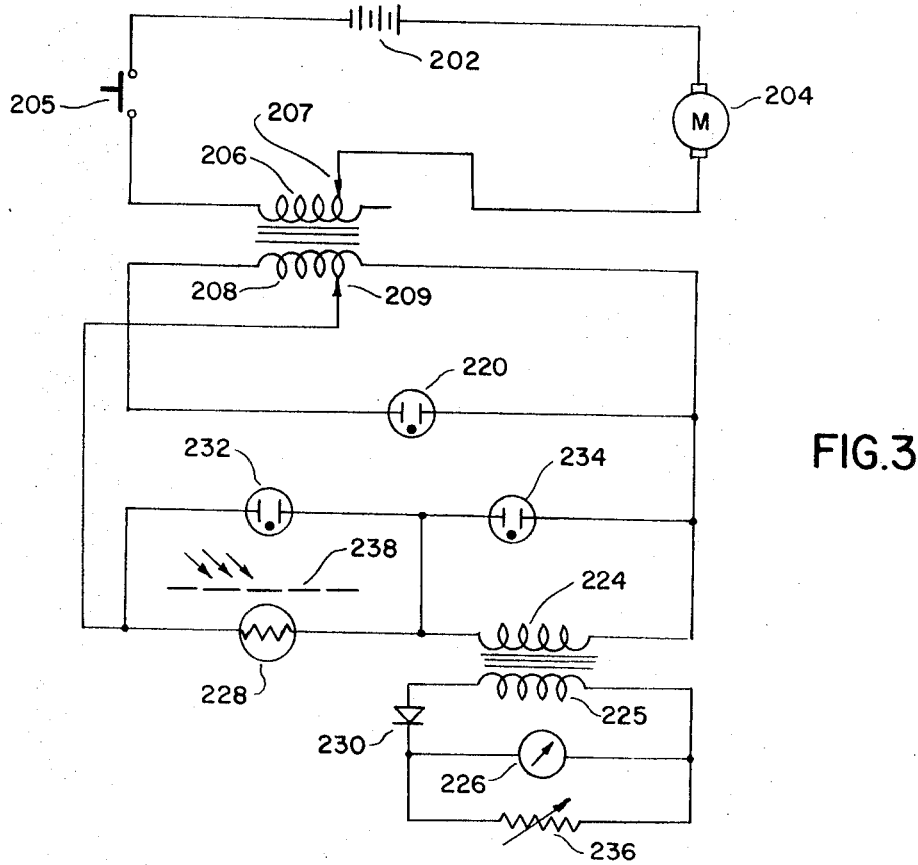

Because certain parts of cinematographic and related apparatus are well known, the following description is directed in particular to those elements forming, or cooperating directly with, the present invention, elements that are not specifically shown or described herein being understood to be selectable from those known in the art.

The use of AC power sources and AC amplifiers has recently become highly developed in various fields where miniaturization of electrical components is desired, e.g., communications systems, satellites, and rocketry, and the applicability of AC electrical systems to the field of photographic exposure control has proven advantageous. In AC exposure-control devices, and indeed in all exposure-control devices, it is desirable that the photographer be warned when lighting conditions are unsuitable to effect proper exposures at existing camera settings, and it is further desirable that he be warned when the electrical source is not supplying sufficient voltage to operate the device. The present invention affords means for providing such warning signals in an AC exposure-control device, and is especially applicable in electric-drive motion picture cameras. The power source contemplated, although not required, is a DC battery for energizing a DC film-drive motor, the electrical output of which is a pulsating DC current. A transformer in the motor electrical output circuit provides an AC voltage and serves as an AC amplifier. Where a 6-volt battery is employed, the transformer should supply about 100 volts in order to operate the gas-discharge lamps to be discussed below. The description to follow relates to use of the invention in motion picture cameras, but the invention is not restricted to that application.

The Preferred Embodiment

In FIG. 1, a battery 2 provides a source of DC power for energizing a DC motor 4 which, as shown schematically, is operatively connected to film-advancing means for advancing film in a manner known in the cinematographic art, as described, for example, in U.S. Pat. No. 3,261,654 to Faber et al. The commutator of motor 4 interrupts the battery current several times per revolution, causing a pulsating DC current to flow through a primary transformer winding 6 and thereby provide a source of AC voltage across a secondary transformer winding 8 in a manner known in the electrical art, as described, for example, in U.S. Pat. No. 2,038,187 to McNeil. A capacitor 12 and an inductor 14 are connected to winding 8 as shown to filter out undesirable harmonics or hash. A switch 5 controls operation of the system. Because winding 8 has more turns than does winding 6, an amplified AC voltage appears between points 16 and 18 in the secondary winding circuit. A gas-discharge signal lamp 20 is connected in series with a calibrating rheostat 22 across points 16 and 18. The rheostat 22 is set so that, as long as battery 2 provides sufficient voltage to operate the camera, lamp 20 will be energized. Should battery 2 fail to provide sufficient voltage to operate the camera, lamp 20 will be extinguished, and the photographer will be warned that corrective action is necessary. The energization levels of the light-level indicator lamps and exposure meter, to be described below, are adjusted in accordance with the film sensitivity, i.e., the ASA film speed, by the position of a tap 10 on secondary winding 8, tap 10 being operatively connected, as shown schematically, to film sensitivity sensing means for sensing film sensitivity in a manner known in the photographic art, as described, for example, in U.S. Pat. No. 3,125,939 to Bundschuh et al.

A variable autotransformer 24 is adjusted by a tap 25 in accordance with the rate of film advancement, i.e., the number of frames per second, tap 25 being operatively connected, as shown schematically, to film-advancing adjustment means for effecting adjustment of the film-advancing means in a manner known in the cinematographic art, as described, for example, in the aforementioned U.S. Pat. No. 3,261,654 to Faber et al. An exposure meter 26 is connected to the output of autotransformer 24 and automatically adjusts the camera diaphragm (not shown) in accordance with the scene light level, meter 26 being operatively connected, as shown schematically, to variable aperture diaphragm means for effecting adjustment of the diaphragm in a manner known in the photographic art, as described, for example, in the aforementioned U.S. Pat. No. 3,125,939 to Bundschuh et al. Meter 26 is preferably a DC meter since DC meters usually are easier to build than the AC type. Therefore, a rectifier 30 is placed in series with the meter 26 to provide the meter with a source of DC voltage. It may be noted that a voltage-operated transducer such a a bimorph could replace meter 26 and autotransformer 24.

Photosensitive means such as a photocell 28 is positioned in the camera so that it receives light from the photometric scene. The photocell is connected to tap 10 of the transformer winding 8. A gas-discharge lamp 32 is connected in parallel with photocell 28. The breakdown voltage of lamp 32 is such that, when there is not enough photometric scene illumination to effect an adequately exposed photograph, lamp 32 ignites. In other words, under a low light condition, the resistance of photocell 28 increases, the voltage drop across lamp 32 reaches the breakdown value and lamp 32 becomes luminous to warn the photographer of the low light condition.

A second gas-discharge lamp 34, similar to lamp 32, is connected in parallel with the windings of autotransformer 24. Lamp 34 ignites when a threshold voltage drop occurs across it; that is, it ignites when the current flow through autotransformer 24 reaches a predetermined value, that value being the one occurring when the photometric scene is too bright for a proper exposure at the existing camera settings and film speed. Thus, when the illumination striking photocell 28 is high, its resistance is low, and there is high current flow through photocell 28 and the windings of autotransformer 24. When the threshold voltage across lamp 34 is reached, it breaks down and ignites, warning the photographer that his photograph will be overexposed if he takes a picture at the present camera settings.

Thus, the embodiment illustrated in FIG. 1 provides warning lamps for high and low light conditions and for inadequate voltage. The system requires minimum power for operation. Only a single photocell is required. It is adjustable for different film sensitivities and different exposures per frame or rates of film advancement.

The First Alternative Embodiment

A circuit similar to that shown in FIG. 1 is illustrated in FIG. 2. A battery 102 supplies current to a motor 104 and to a transformer comprising a primary winding 106 and a secondary winding 108. The system is actuated by closing a control switch 105. The transformer filter elements include an inductor 114 and a capacitor 112. A gas-discharge tube 120 and a calibrating rheostat 122 are connected across the transformer and filter circuit, and serve to indicate the sufficiency of the voltage supplied by battery 102. A photocell 128 and a gas-discharge lamp 132 function as described previously with reference to their counterparts 28 and 32, respectively, in FIG. 1.

A DC exposure meter 126 and a rectifier 130 are connected to the secondary winding of a variable transformer 124. While the variable autotransformer 24 of FIG. 1 uses less power, the variable transformer 124 shown in FIG. 2 provides more effective isolation of the exposure meter in the secondary winding circuit from the electrical effects of the primary circuitry. The energization level of exposure meter 126 is adjusted in accordance with the film sensitivity by a tap 125, which operates of the primary winding of variable transformer 124.

A gas-discharge tube 134 is connected across variable transformer 124 and fires when an excess-light condition exists, as described previously with reference to lamp 34 in FIG. 1. When an excess-light condition exists, the voltage drop across photocell 128 is low, the voltage drop across lamp 134 is high, and the light ignites.

The Second Alternative Embodiment

A somewhat simplified modification of the circuit shown in FIG. 1 is illustrated in FIG. 3. A primary transformer circuit comprises a battery 202 for energizing a motor 204 and supplying pulsating DC current to a primary transformer winding 206. An amplified AC voltage appears across a secondary transformer winding 208 upon closing of a switch 205. The ignition levels of the light-level indicator lamps, to be described below, are regulated in accordance with film sensitivity by a tap 209 that operates off secondary winding 208. The number of turns in winding 206 that are operating in the primary circuit can be regulated by a tap 207. A gas-discharge lamp 220 is connected across secondary winding 208, and, as described previously with reference to lamps 20 and 120 shown in FIGS. 1 and 2, lamp 220 remains ignited as long as battery 202 supplies adequate voltage to operate the camera. A photocell 228, which is connected in series with tap 209, regulates the voltage across a low light indicator lamp 232 and the current in a transformer winding 224 in accordance with scene light conditions. When light striking photocell 228 is at a critically low intensity, i.e., when an underexposure would result under an existing lighting condition, the resistance in photocell 228 increases so that the voltage drop across photocell 228 and across lamp 232 is of such magnitude that lamp 232 ignites to give the photographer a low light warning. And, when the light level increases to a critically high intensity, above which an overexposure would result, the resistance across photocell 228 decreases, resulting in a high voltage drop across winding 224 and the igniting of a high light indicator lamp 234 connected in parallel with winding 224.

An exposure meter 226 is provided in the circuit of a secondary transformer winding 225. Since a DC exposure meter is preferred, for the reason mentioned previously, a rectifier 230 is included in the meter circuit. Meter 226, as shown in FIG. 3, is calibrated in accordance with the rate of film advancement by a shunting rheostat 236.

It may at times be desirable to alter the levels of illumination at which low light lamp 232 and high light lamp 234 ignite. This is made possible by attenuating the light incident upon photocell 228 by means of neutral-density filters, shown diagrammatically at 238. If the ignition levels of lamps 232 and 234 are at certain light levels when the light incident upon photocell 228 is attenuated by a given neutral-density filter, it will be seen that, upon increasing the density of the filter, the photometric scene illumination can be increased before the ignition voltage of either of the lamps is attained; and, upon decreasing the density of the neutral-density filter, the critical scene illumination is similarly reduced. It will be further apparent that this device can be employed with the photocells of each of the embodiments of the invention herein described.

The Third Alternative Embodiment

Figure 4:
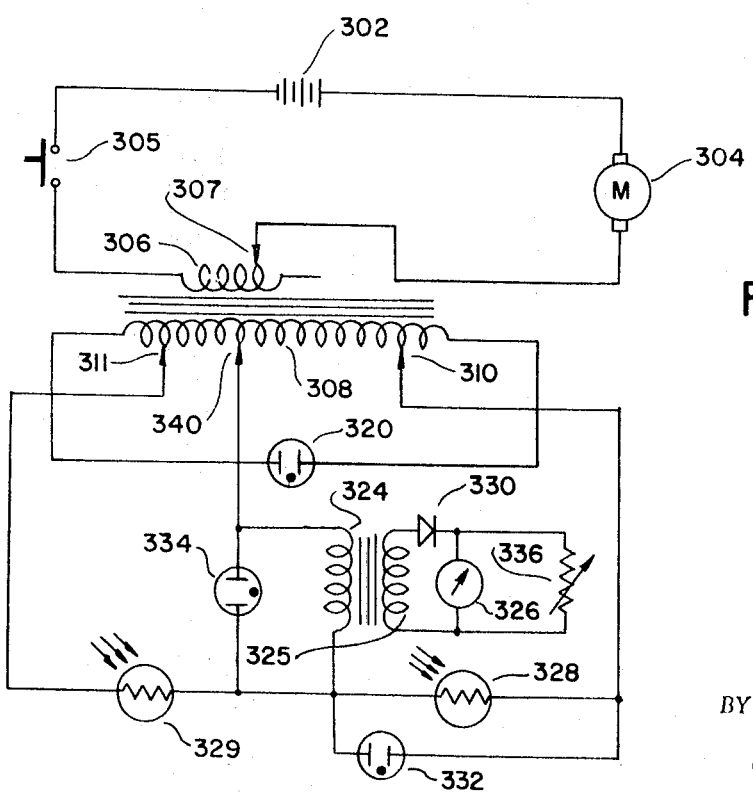

The embodiment shown in FIG. 4 represents a binary AC exposure-control system which is sensitive to the light levels of different parts of the photometric scene. A primary transformer circuit comprises a battery 302, a switch 305, a motor 304, a variable primary winding 306, and a tap 307. A voltage-indicator gas-discharge lamp 320 is connected across a secondary transformer winding 308.

Figure 5:
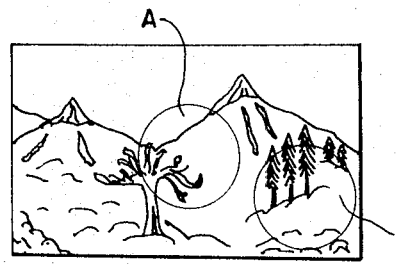
FIG. 5 shows schematically a photometric scene having different portions separately identified.

Referring to FIG. 5, which represents a photometric scene, the scene is shown divided into two portions—a central portion A and a peripheral or background portion B. Normally, the photographic subject will be in the central portion A of the scene. Occasionally, the light level of the central portion A will differ from the background portion B. Since the light level of the area in which the subject is located is of primary interest to the photographer, it is desirable that the light-level indicators be "center weighed" subject to the effects of the background illumination. Thus, in the embodiment shown in FIG. 4, one photocell 328 receives illumination from central portion A of the photometric scene, and a second photocell 329 receives illumination from background portion B.

The voltage across secondary transformer winding 308 is allocated to photocells 328 and 329 in accordance with the position of a tap 340. Since the light incident upon photocell 328 is to have a greater effect on the system, a greater portion of the total voltage available at winding 308 is impressed across photocell 328 by positioning tap 340 substantially as shown. Changes in film sensitivity are compensated for by the positions of taps 310 and 311. A DC exposure meter 326, which automatically sets the camera diaphragm (not shown) as mentioned earlier, is coupled to the circuit by transformer windings 324 and 325. The current to meter 326 is rectified by a diode 330. The meter is calibrated in accordance with the rate of film advancement by a rheostat 336.

The problem of underexposure of film to the subject of primary interest under apparently correct exposure settings is alleviated by this embodiment. This problem frequently arises when the subject is substantially less illuminated than the background, and, although the average illumination of the entire scene is at an acceptable level, the portion of primary interest is too dark. For this reason, a low light indicator lamp 332 is connected only across photocell 328, which, it will be recalled, receives illumination from central portion A of the photometric scene. Thus, only when the central portion of the scene is inadequately illuminated, thereby increasing the voltage drop access cell 328 to the breakdown voltage of lamp 332, will lamp 332 become luminous.

The problem of overexposure usually relates to the entire picture rather than to only the background or central portion thereof. Hence, excess-light indicator lamp 334 is under the influence of both photocells 328 and 329. When the total scene illumination from both portions A and B of the photometric scene incident upon photocells 328 and 329 is sufficient to reduce their cumulative resistance so that the breakdown voltage across excess-light lamp 334 is reached, lamp 334 will ignite to indicate the excessive illumination level. The voltage drop across cell 328, representing the illumination from central portion A of the photometric scene, is normally more influential than that across cell 329, representing the illumination from background portion B, because of the location of tap 340 on winding 308, as explained above.

The Fourth Alternative Embodiment

Figure 6:
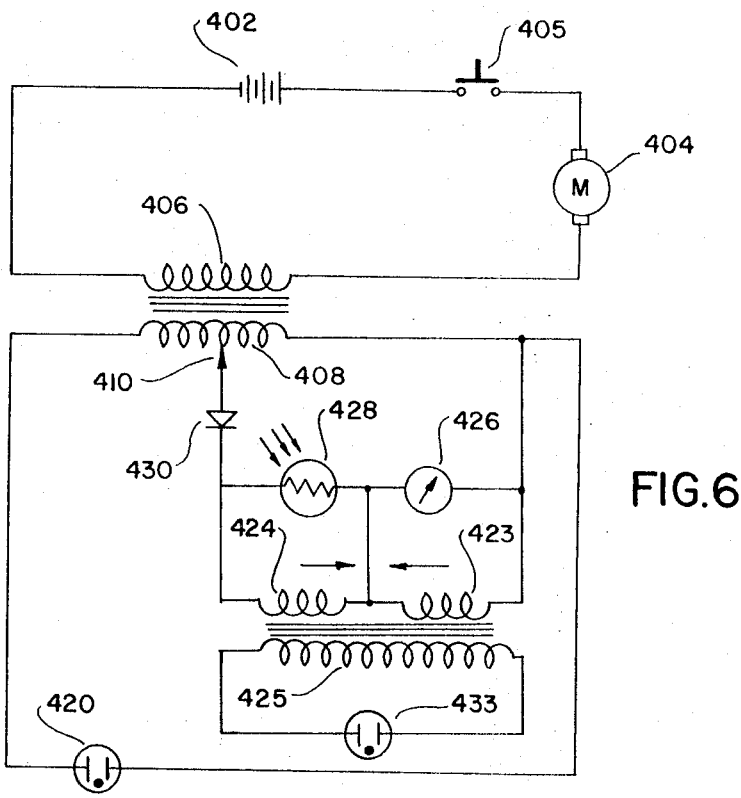

FIG. 6 shows an embodiment of the invention requiring only one photocell and only one light-level indicator lamp. The primary transformer circuit comprises a battery 402, a motor 404, a switch 405, and a primary transformer winding 406. Connected across a secondary winding 408 is a discharge lamp 420, which is extinguished when the power supply is insufficient. The exposure-control system is calibrated for film sensitivity by the positioning of a tap 410 on secondary winding 408. A photocell 428 is connected in series with an exposure meter 426, and opposing transformer primary windings 424 and 423 are connected in parallel with photocell 428 and meter 426 respectively. A rectifier 430 causes the meter-photocell circuit to be energized by pulsating DC current. A gas-discharge lamp 433 is connected to a transformer secondary winding 425, which is energized in accordance with the output of primary windings 423 and 424. A result of the pulsating DC current energizing windings 423 and 424 is the appearance of an AC voltage across winding 425 when the voltages across photocell 428 and meter 426 are unequal.

When the voltages across photocell 428 and meter 426 are equal, the net voltage across opposed winding 423 and 424 is zero, there is no net voltage across winding 425, and lamp 433 is out. But, whenever the voltages across photocell 428 and meter 426 are unequal, there is a net voltage across winding 425. When the voltage across winding 425 reaches the breakdown voltage of lamp 433, the lamp ignites. The characteristics of the system are such that, when insufficient- and excess-illumination conditions exist, the breakdown voltage of lamp 433 is reached, causing lamp 433 to ignite and thereby warn the photographer that one of those conditions exists, which of the two conditions presumably being readily apparent to the photographer.

Thus, when the scene illumination incident upon photocell 428 is insufficient, the voltage drop across photocell 428 exceeds that across meter 426, the voltage drop across winding 424 exceeds that across winding 423, the voltage drop across winding 424 exceeds that across winding 423, and a net voltage is generated across winding 425. When the net voltage across winding 425 reaches the breakdown voltage of lamp 433, light 433 goes on. Likewise, when the scene illumination incident upon photocell 428 is excessive, the voltage drop across photocell 428 is less than that across meter 426, the voltage drop across winding 424 is less than that across winding 423, and a net voltage is generated across winding 425. If the resulting voltage across winding 425 reaches the breakdown voltage of lamp 433, the lamp 433 goes on to warn the photographer that he should readjust the camera.

Figure 7:
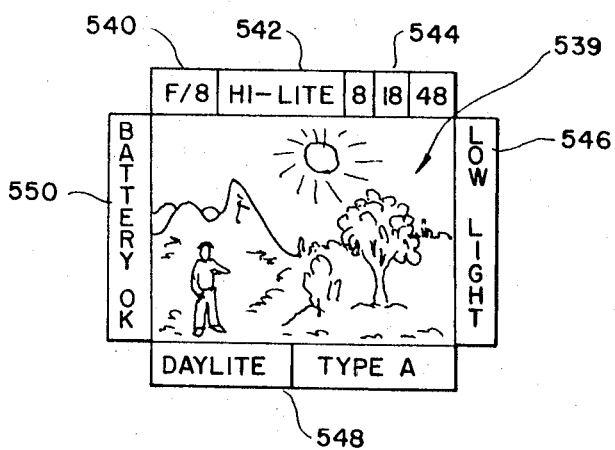
FIG. 7 illustrates a viewfinder display of various signals.

The use of warning lamps as described above makes possible a compact yet easily understandable display in the camera viewfinder of all the relevant information the photographer may want at his disposal. FIG. 7 illustrates various signals appearing at the perimeter of a viewfinder 539. Area 540 shows the diaphragm setting, which may be represented by transilluminated figures in a manner known in the art. The arc-discharge lamps, described previously, for indicating sufficient battery voltage, excess light, and insufficient light may be arranged to illuminate translucent display panels 550, 542, and 546, respectively, upon ignition. The type of film loaded in the camera could be indicated at 548 by any manner known in the art. And the rate of film advancement for which the photographer has the camera set could similarly be indicated at 544.

The aforementioned embodiments have been described with reference to automatic motion picture cameras having automatic exposure-control devices, as indicated by the presence of a coupled exposure meter in each of the illustrated circuits. These embodiments may be readily adapted to cameras not having such a meter. Similarly, the compensations for film sensitivity and rate of film advancement may be dispensed with. Also, the invention is adaptable to use in still cameras as well as movie cameras. Regardless of the camera in which the invention is employed, it will be observed that the invention provides a compact, reliable, and easy-to-use warning system energized by AC power.

The invention has been described in detail with particular reference to the illustrated preferred and alternative embodiments thereof, but it will be understood that variations and modifications can be effected within the spirit and scope of the invention.

I claim:

1. In a motion picture camera having means for receiving a film, means for receiving a DC power source, and a DC motor operatively connectable to the received DC power source for advancing a received film, an exposure control device comprising:
    a. transformer having a primary winding electrically connected in series relationship to the DC power source and the DC motor and a secondary winding for providing a source of alternating voltage;
    photoelectric means operatively connected to said source of alternating voltage for receiving radiation from a scene, said photoelectric means having an electrical parameter that is variable in relation to the intensity of the radiation received from the scene; and
    means operatively connected to, and responsive to variations in the electrical parameter of, said photoelectric means for indicating whether the intensity of radiation from the scene is suitable to effect a satisfactory exposure of the received film.

2. The device claimed in claim 1 wherein said secondary winding has more turns than does said primary winding to provide a source of amplified alternating voltage.

3. The device claimed in claim 1 further comprising means operatively connected to said source of alternating voltage for indicating whether the DC power source is adequate.

4. The device claimed in claim 3 wherein each of said radiation intensity indicating means and said DC power source indicating means includes a gas-discharge lamp.